US012553282B2

(12) United States Patent
Blair et al.

(10) Patent No.: US 12,553,282 B2
(45) Date of Patent: *Feb. 17, 2026

(54) MOTORIZED SHEER SHADING SYSTEM

(71) Applicant: Lutron Technology Company LLC, Coopersburg, PA (US)

(72) Inventors: Edward J. Blair, Telford, PA (US); Samuel F. Chambers, Gwynedd Valley, PA (US); Stephen Lundy, Coopersburg, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 292 days.

This patent is subject to a terminal disclaimer.

(21) Appl. No.: 18/340,118

(22) Filed: Jun. 23, 2023

(65) Prior Publication Data

US 2023/0349227 A1 Nov. 2, 2023

Related U.S. Application Data

(60) Continuation of application No. 16/798,612, filed on Feb. 24, 2020, now Pat. No. 11,725,454, which is a (Continued)

(51) Int. Cl.

*E06B 9/68* (2006.01)
*E06B 9/24* (2006.01)

(Continued)

(52) U.S. Cl.

CPC ................ *E06B 9/264* (2013.01); *E06B 9/24* (2013.01); *E06B 9/34* (2013.01); *E06B 9/42* (2013.01);

(Continued)

(58) Field of Classification Search

CPC ............... E06B 9/68; E06B 2009/6809; E06B 2009/6818; E06B 2009/6845;

(Continued)

(56) References Cited

U.S. PATENT DOCUMENTS

| | | | |
|---|---|---|---|
| 2,013,500 | A | 9/1935 | Connor et al. |
| 3,809,143 | A | 5/1974 | Ipekgil |

(Continued)

FOREIGN PATENT DOCUMENTS

| | | | |
|---|---|---|---|
| EP | 886030 | A2 | 12/1998 |
| EP | 0913748 | A2 | 5/1999 |

(Continued)

OTHER PUBLICATIONS

Elegazzo, Grand Elegance Power Blinds Product Literature, 2008, 8 pages.

(Continued)

*Primary Examiner* — Abe Massad
(74) *Attorney, Agent, or Firm* — Michael S. Czarnecki; Glen R. Farbanish; Philip N. Smith

(57) ABSTRACT

A motorized sheer shading system may move a sheer shade material between an open position, a closed position, and a view position. The shading system may move the sheer shade material from the open position to the closed position at a first average rotational speed, and from the closed position to the view position at a second average rotational speed. The shading system may automatically determine a control limit that corresponds to the closed position of the sheer shade material after control limits have been set for the open position and the view position. The shading system may cause the sheer shade material to stop moving once it reaches the closed position if the raise button of a remote control is still depressed, and may cause the sheer shade material to stop moving once it reaches the closed position if the lower button of the remote control is still depressed.

18 Claims, 7 Drawing Sheets

Related U.S. Application Data continuation of application No. 15/438,693, filed on Feb. 21, 2017, now Pat. No. 10,570,661, which is a division of application No. 14/450,211, filed on Aug. 2, 2014, now Pat. No. 9,611,689.

(60) Provisional application No. 61/880,334, filed on Sep. 20, 2013, provisional application No. 61/861,697, filed on Aug. 2, 2013.

(51) Int. Cl.

| | |
|---|---|
| ***E06B 9/264*** | (2006.01) |
| ***E06B 9/34*** | (2006.01) |
| ***E06B 9/42*** | (2006.01) |
| ***E06B 9/72*** | (2006.01) |

(52) U.S. Cl.
CPC ........ *E06B 9/72* (2013.01); *E06B 2009/2435* (2013.01); *E06B 2009/6818* (2013.01); *E06B 2009/6845* (2013.01)

(58) Field of Classification Search
CPC ..... E06B 2009/2435; E06B 2009/2447; E06B 9/264; E06B 9/24; E06B 9/34; E06B 9/42
See application file for complete search history.

(56) References Cited

U.S. PATENT DOCUMENTS

| | | | |
|---|---|---|---|
| 4,914,360 | A | 4/1990 | Hsieh et al. |
| 5,391,967 | A | 2/1995 | Domel et al. |
| 5,413,161 | A | 5/1995 | Corazzini |
| 5,663,621 | A | 9/1997 | Popat |
| 5,760,558 | A | 6/1998 | Popat |
| 5,793,174 | A | 8/1998 | Kovach et al. |
| 5,883,480 | A | 3/1999 | Domel et al. |
| 5,990,646 | A | 11/1999 | Kovach et al. |
| 6,057,658 | A | 5/2000 | Kovach et al. |
| 6,060,852 | A | 5/2000 | Domel et al. |
| 6,100,659 | A | 8/2000 | Will et al. |
| 6,181,089 | B1 | 1/2001 | Kovach et al. |
| 6,196,508 | B1 | 3/2001 | Nijs |
| 6,259,218 | B1 | 7/2001 | Kovach et al. |
| 6,299,115 | B1 | 10/2001 | Kovach et al. |
| 6,369,530 | B2 | 4/2002 | Kovach et al. |
| 6,688,369 | B2 | 2/2004 | Colson et al. |
| 6,812,662 | B1 | 11/2004 | Walker |
| 7,059,378 | B2 | 6/2006 | Colson et al. |
| 7,147,029 | B2 | 12/2006 | Kovach et al. |
| 7,281,565 | B2 | 10/2007 | Carmen, Jr. et al. |
| 7,315,146 | B2 | 1/2008 | Bejean |
| 7,401,634 | B2 | 7/2008 | Kovach et al. |
| 7,466,090 | B2 | 12/2008 | Meewis et al. |
| 7,537,040 | B2 | 5/2009 | Carmen, Jr. et al. |
| 7,635,018 | B2 | 12/2009 | Carmen, Jr. et al. |
| 7,673,667 | B2 | 3/2010 | Domel et al. |
| 7,719,215 | B2 | 5/2010 | Meewis et al. |
| 7,737,653 | B2 | 6/2010 | Carmen, Jr. et al. |
| 7,839,109 | B2 | 11/2010 | Carmen, Jr. et al. |
| 7,923,948 | B2 | 4/2011 | Rodas et al. |
| 7,982,422 | B2 | 7/2011 | Meewis et al. |
| 8,723,466 | B2 | 5/2014 | Chambers et al. |
| 9,359,813 | B2 | 6/2016 | Colson |
| 10,570,661 | B2 | 2/2020 | Blair et al. |
| 2002/0189771 | A1 | 12/2002 | Colson et al. |
| 2004/0154755 | A1 | 8/2004 | Judkins |
| 2005/0146299 | A1 | 7/2005 | Mommaerts |
| 2005/0183835 | A1 | 8/2005 | Nien |
| 2005/0194104 | A1 | 9/2005 | Nien |
| 2005/0199350 | A1 | 9/2005 | Lin |
| 2006/0086874 | A1 | 4/2006 | Habel et al. |
| 2007/0079943 | A1 | 4/2007 | Smith et al. |
| 2008/0262637 | A1 | 10/2008 | Dorrough |
| 2009/0152422 | A1 | 6/2009 | Ng et al. |
| 2009/0256021 | A1 | 10/2009 | Dorrough |
| 2011/0240232 | A1 | 10/2011 | Kluck |
| 2011/0251720 | A1 | 10/2011 | Neuman |
| 2012/0048481 | A1 | 3/2012 | Feldstein et al. |
| 2012/0048490 | A1 | 3/2012 | Feldstein et al. |
| 2012/0050596 | A1 | 3/2012 | Feldstein et al. |
| 2012/0053729 | A1 | 3/2012 | Feldstein et al. |
| 2012/0053731 | A1 | 3/2012 | Feldstein et al. |
| 2012/0073765 | A1 | 3/2012 | Hontz et al. |
| 2012/0125543 | A1 | 5/2012 | Chambers et al. |
| 2012/0222828 | A1 | 9/2012 | Kwak |
| 2013/0068904 | A1 | 3/2013 | Wills et al. |
| 2014/0262069 | A1 | 9/2014 | Drew et al. |
| 2015/0034257 | A1 | 2/2015 | Blair et al. |
| 2015/0034260 | A1 | 2/2015 | Blair et al. |

FOREIGN PATENT DOCUMENTS

| | | | |
|---|---|---|---|
| EP | 972906 | A1 | 1/2000 |
| EP | 1496190 | A1 | 1/2005 |
| EP | 1811122 | A2 | 7/2007 |
| EP | 2256284 | A2 | 12/2010 |
| EP | 24 76859 | A2 | 7/2012 |
| GB | 2319278 | A | 5/1998 |

OTHER PUBLICATIONS

Lee et al., "Integrated Performance of an Automated Venetian Blind/Electric Lighting System in a Full-Scale Private Office", Proceedings of the ASHRAE/DOE/BTECC Conference, LBNL-41443, Lawrence Berkeley National Laboratory, Berkeley, California, Sep. 1998, 26 pages.

Lee et al., "Low-Cost Networking for Dynamic Window Systems", Energy and Buildings 36, LBNL-52198, Lawrence Berkeley National Laboratory, Berkeley, California, 2004, 13 pages.

Lutron, "Controlling Hunter Douglas Silhouette Shades From Homeworks Master Keypads", Lutron Electronics Co., Inc., Application Note #30, 1997, 2 Pages.

Lutron, "Lutron Roller 100/Roller 150 Wall Mount Chassis", Lutron Electronics Co., Inc., 2012, pp. 1-2.

Sivioa, "Coupled Shade System with End Motor"; Lutron Electronics Co., Inc., 2003, pp. 1-8.

MOTORIZED SHEER SHADING SYSTEM

CROSS-REFERENCE TO RELATED APPLICATIONS

This application is a continuation of U.S. patent application Ser. No. 16/798,612, filed Feb. 24, 2020; which is a continuation of U.S. patent application Ser. No. 15/438,693, filed Feb. 21, 2017, now U.S. Pat. No. 10,570,661 issued Feb. 25, 2020; which is a divisional of U.S. patent application Ser. No. 14/450,211, filed Aug. 2, 2014, now U.S. Pat. No. 9,611,689, issued Apr. 4, 2017; which claims priority to U.S. Provisional Patent Application No. 61/861,697, filed Aug. 2, 2013, and to U.S. Provisional Patent Application No. 61/880,334, filed Sep. 20, 2013, all of which are incorporated herein by reference in their respective entireties.

BACKGROUND

Sheer shading systems, such as horizontal sheer blinds or soft sheer shades, may include sheer shade materials that include first and second spaced apart, vertically extending sheer fabrics and a plurality of vertically spaced, transversely extending vanes that are attached between the first and second sheer fabrics. The sheer fabrics are often made of a translucent material and may be in the form of woven or knitted fabrics, non-woven fabrics, or sheets of plastic material. The vanes are often made of an opaque material.

In such a sheer shade system, an upper end of the shade material may be attached to a roller tube, and an opposed lower end of the shade material may be attached to a weighted hembar, such that the shade material hangs, for instance in front of a window. Rotation of the roller tube may raise or lower the shade material between respective open and closed positions.

When the shade material is in the closed position, further rotation of the roller tube may cause the vanes to tilt relative to the sheer fabrics, to thereby position the shade material in a view position. The shade material may have an open position wherein the shade material is not covering the window, a closed position wherein the shade material is covering the window such that visualization through the shade is impeded, and a view position wherein the shade material is covering the window such that visualization through the shade material is permitted.

The shade material of such a sheer shading system is typically moved between the open, closed, and view positions via a pull cord that is attached to the roller tube. However, moving the shade material of a sheer shading system with a pull cord may be undesirable. For example, in installations that include multiple sheer shading systems, it may be time and consuming and burdensome to manually adjust each shade material. Additionally, a pull cord may distract from the aesthetic of a sheer shading system installation.

SUMMARY

As described herein, a motorized sheer shading system may include a housing, a roller tube that is rotatably mounted to the housing, a sheer shade material that is windingly attached to the roller tube, and a motor that is operably coupled to the roller tube such that rotation of the roller tube by the motor causes the sheer shade material to move between an open position wherein the sheer shade material is wound about the roller tube, a closed position wherein the sheer shade material covers an opening and visualization through the sheer shade material is impeded, and a view position wherein the sheer shade material covers the opening and visualization through the sheer shade material is permitted.

The sheer shade material may include a first sheer fabric, a second sheer fabric that is spaced from the first sheer fabric, and a plurality of vanes that are pivotally attached to the first and second sheer fabrics. The plurality of vanes may tilt relative to the first and second sheer fabrics when the sheer shade material moves between the closed position and the view position.

The motorized sheer shading system may be configured to control the motor during movement of the sheer shade material from the open position to the closed position such that the roller tube rotates at a first average rotational speed, and to control the motor during movement of the sheer shade material from the closed position to the view position such that the roller tube rotates at a second average rotational speed that is slower than the first average rotational speed.

The motorized sheer shading system may be configured to vary the rotational speed of the roller tube during movement of the sheer shade material from the open position to the closed position such that a lower end of the first sheer fabric moves at a first speed, and to reduce the rotational speed of the roller tube during movement of the sheer shade material from the closed position to the view position such that the lower end of the first sheer fabric moves at a second speed that is slower than the first speed.

The motorized sheer shading system may be configured to automatically determine a control limit that corresponds to the closed position of the sheer shade material, for example after control limits have been set for the open position and the view position. The control limit for the closed position may be determined based on one or more of the control limit for the view position, a distance between first and second sheer fabrics of the sheer shade material, or the second speed.

The motorized sheer shading system may include a remote control device that includes a raise button that causes the motor to move the sheer shade material from the view position to the closed position and from the closed position to the open position when depressed, and a lower button that causes the motor to move the sheer shade material from the open position to the closed position and from the closed position to the view position when depressed.

The motorized sheer shading system may be configured such that when the sheer shade material moves between the view position and the closed position, toward the closed position, the motor causes the sheer shade material to stop moving once the sheer shade material reaches the closed position if the raise button is still depressed. The motorized sheer shading system may be configured such that when the sheer shade material moves between the open position and the closed position, toward the closed position, the motor causes the sheer shade material to stop moving once the sheer shade material reaches the closed position if the lower button is still depressed.

DETAILED DESCRIPTION

Figure 1B:
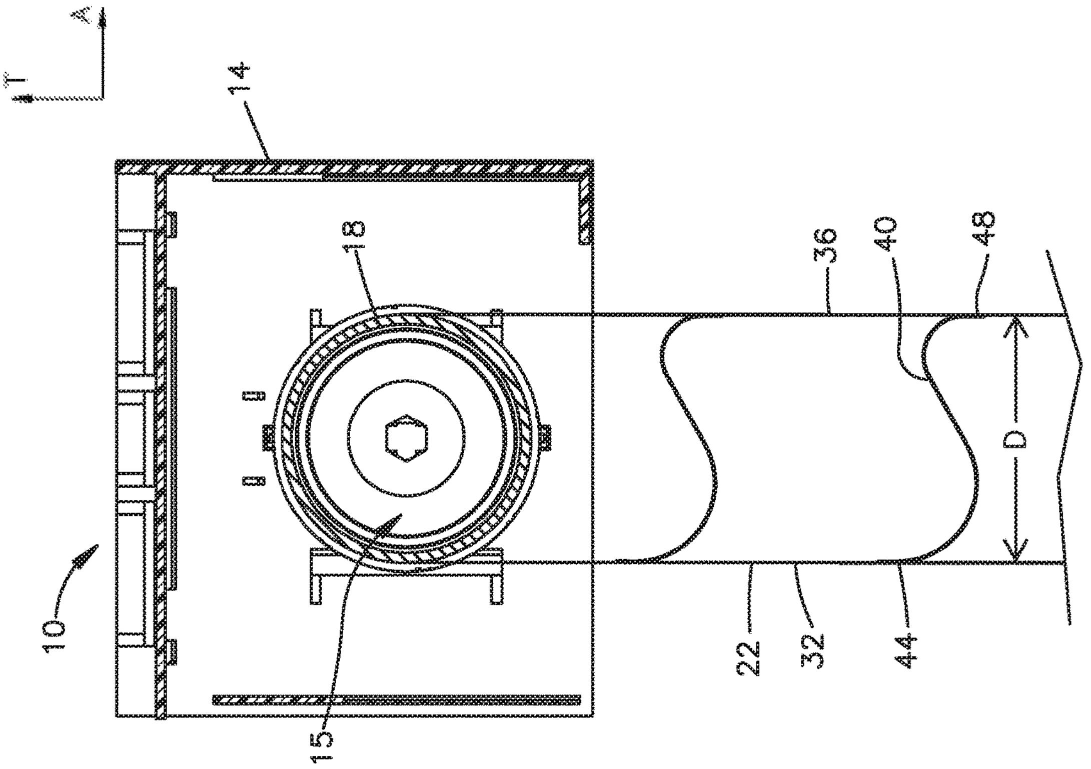
FIG. 1B depicts a cross-section of the example motorized sheer shading system depicted in FIG. 1A.
Figure 1A:
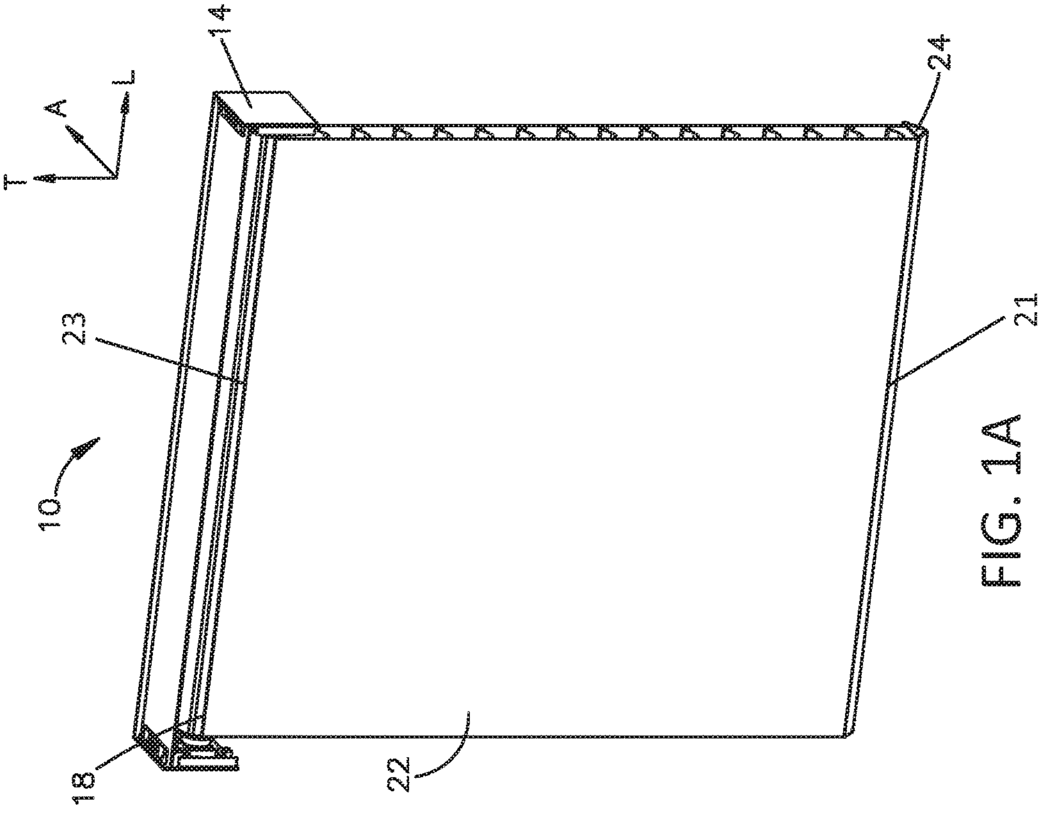
FIG. 1A is a perspective view of an example motorized sheer shading system that includes a housing, a roller tube that is rotatably mounted to the housing, a sheer shade material that is windingly attached to the roller tube, and a motor that is configured to move the sheer shade material between an open position, a closed position, and a view position.
Figures 2A, 2B, 2C:
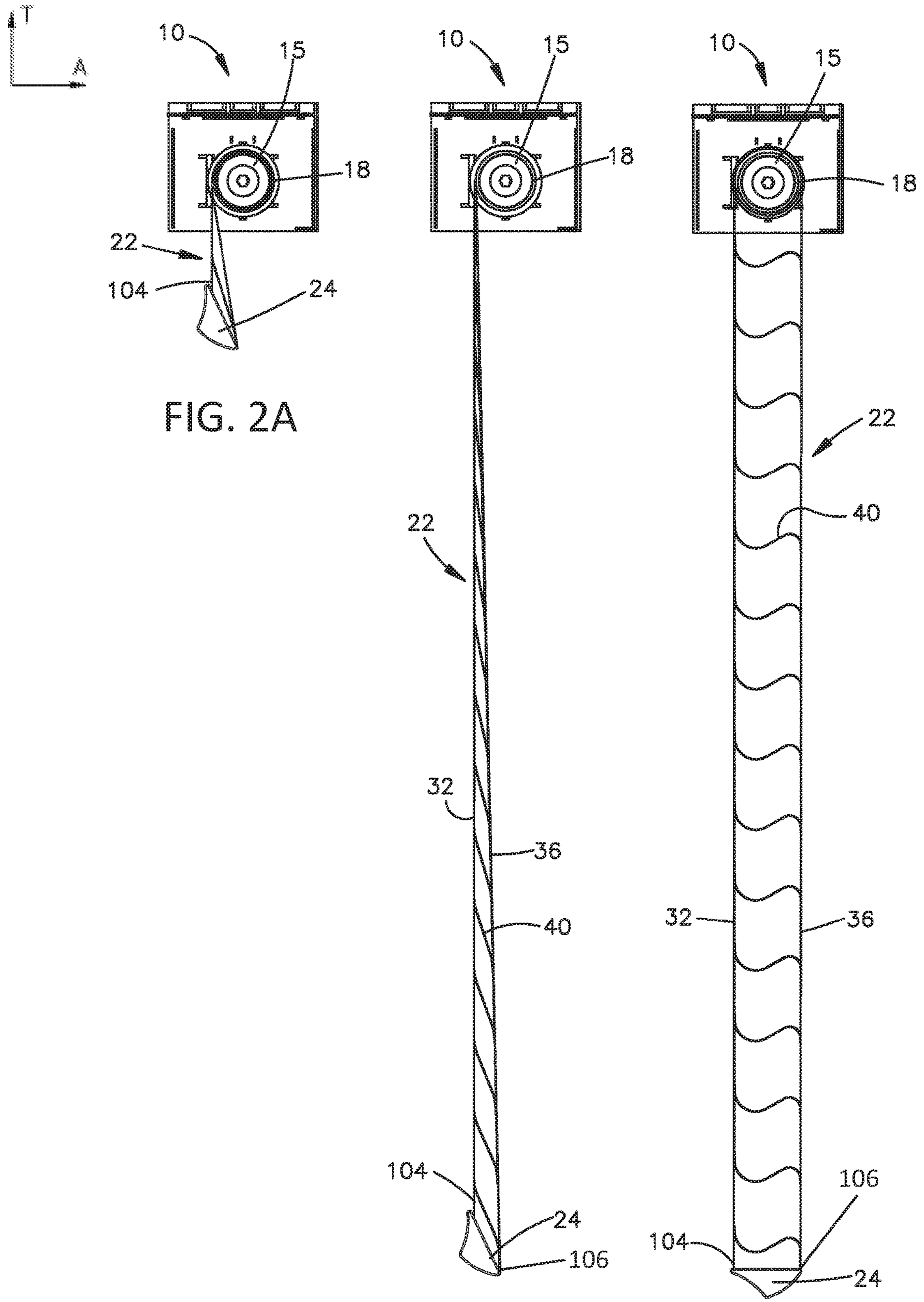
FIG. 2A depicts a cross-section of the example motorized sheer shading system depicted in FIG. 1A, with the sheer shade material in an open position.
FIG. 2B depicts a cross-section of the example motorized sheer shading system depicted in FIG. 1A, with the sheer shade material in a closed position wherein visualization through the sheer shade material is impeded.
FIG. 2C depicts a cross-section of the example motorized sheer shading system depicted in FIG. 1A, with the sheer shade material in a view position wherein visualization through the sheer shade is permitted.

FIGS. 1A and 1B depict an example a motorized sheer shading system 10 (e.g., horizontal sheer blinds or soft sheer shades). As shown, the motorized sheer shading system 10 includes a housing 14 (e.g., a pocket or a headrail) that is configured to be coupled to or otherwise mounted to a structure. For example, the housing 14 may be configured to be mounted to (e.g., attached to) a window frame, wall, or other structure, such that the motorized sheer shading system 10 is mounted proximate to an opening (e.g., over or in the opening), such as a window for example. The motorized sheer shading system 10 may further include a roller tube 18 that is rotatably mounted (e.g., rotatably supported) within the housing 14. The motorized sheer shading system 10 may further include a covering material, for example a sheer shade material 22, that is windingly attached to the roller tube 18, such that rotation of the roller tube 18 causes the sheer shade material 22 to wind or unwind from the roller tube 18, and thereby to move between an open position as shown in FIG. 2A, a closed position as shown in FIG. 2B, and a view position as shown in FIG. 2C. As shown, the sheer shade material 22 defines a lower end 21 that may be referred to as a first end, and an opposed upper end 23 that may be referred to as a second end. The motorized sheer shading system 10 may include a hembar 24 that is attached to the lower end 21 of the sheer shade material 22. The hembar 24 may be configured, for instance weighted, to cause the sheer shade material 22 to hang vertically. The upper end 23 of the sheer shade material 22 may be coupled to the roller tube 18, such that rotation of the roller tube 18 causes the hembar 24 to move toward or away from the housing 14. The housing 14 may be made of any suitable material, such as plastic or metal. It should be appreciated that the housing 14 may be made from any material, or from any combination of materials.

As shown in FIGS. 1A and 2A-2C, the sheer shade material 22 is windingly attached to the roller tube 18 and is configured to be moved between the open position, the closed position, and the view position. As shown, the sheer shade material 22 may include a first sheer fabric 32 that extends vertically (e.g., hangs) from a first location on the roller tube 18, a second sheer fabric 36 that extends vertically (e.g., hangs) from a second location on the roller tube 18 and that is laterally spaced from the first sheer fabric 32, and a plurality of vertically spaced vanes 40 that extend between the first and second sheer fabrics 32, 36.

In accordance with the illustrated orientation of the motorized sheer shading system 10, the first and second sheer fabrics 32, 36 extend vertically along a transverse direction T that may be referred to as a first direction, and extend horizontally along a longitudinal direction L that extends perpendicular to the transverse direction T, and that may be referred to as a second direction. As shown, the first and second sheer fabrics 32, 36 are spaced from each other along a lateral direction A that extends perpendicular to the transverse direction T and to the longitudinal direction L, and that may be referred to as a third direction.

The first and second sheer fabrics 32, 36 may be made of a translucent material, such that visualization through the first and second sheer fabrics 32, 36 may be permitted. As shown, the vanes 40 are vertically spaced from each other along the transverse direction T, for example when the sheer shade material 22 is in the view position (e.g., as shown in FIG. 2C). Each vane 40 defines a first end 44 and an opposed second end 48. As shown, the first end 44 of each vane 40 may be attached (e.g., pivotally attached) to the first sheer fabric 32, and the second end 48 of each vane 40 may be attached (e.g., pivotally attached) to the second sheer fabric 36. The vanes 40 may be made of an opaque material, such that visualization through the vanes 40 is impeded (e.g., substantially impeded) or otherwise not permitted. For example, the vanes 40 may be made of blackout and/or light filtering materials.

When the sheer shade material 22 is in the closed position (e.g., as shown in FIG. 2B), the plurality of vanes 40 may be oriented substantially parallel to the first and second sheer fabrics 32, 36 (e.g., oriented vertically relative to the first and second sheer fabrics 32, 36), such that visualization through the sheer shade material 22 may be impeded by the vanes 40. For example, when the sheer shade material 22 is in the closed position, corresponding opposed ends of the plurality of vanes 40 may align with and/or overlap each other. To illustrate, when the sheer shade material 22 is in the closed position, the second end 48 of a first vane 40 may be substantially aligned with (e.g., along the transverse direction T and/or the lateral direction A) and/or may overlap a corresponding portion of the first end 44 of a second vane 40 that is immediately adjacent (e.g., above or below) the first vane 40, such that visualization between adjacent vanes 40 is impeded.

As the sheer shade material 22 moves from the closed position to the view position, the plurality of vanes 40 may angularly tilt (e.g., pivot) relative to the first and second sheer fabrics 32, 36, such that the corresponding opposed ends of adjacent vanes 40 move away from each other along the transverse direction T. When the sheer shade material 22 is in the view position (e.g., as shown in FIG. 2C), the plurality of vanes 40 may be oriented substantially perpendicular to the first and second sheer fabrics 32, 36 (e.g., oriented horizontally relative to the first and second sheer fabrics 32, 36), such that visualization through the sheer shade material 22 may be permitted (e.g., between the vanes 40).

In the illustrated embodiment, the first sheer fabric 32 is attached to a rear side of the roller tube 18 and the second sheer fabric 36 is attached to a front side of the roller tube 18 such that as the hembar 24 pivots from the closed position to the view position, a lower end 104 of the first sheer fabric 32 will move downward along the first direction while a lower end 106 of the second sheer fabric 36 will substantially remain stationary along the first direction. In this regard, the lower end 104 of the first sheer fabric 32 may pivot (e.g., about the lower end 106 of the second sheer fabric 36) as the sheer shade material 22 moves between the closed and view positions. It should be appreciated that the sheer shade material 22 is not limited to the illustrated attachment relative to the roller tube 18. For example, the first sheer fabric 32 may be attached to the front side of the roller tube 18 and the second sheer fabric 36 may be attached to the rear side of the roller tube 18.

As shown in FIG. 1B, the motorized sheer shading system 10 may further include a drive system such as a motor drive unit 15 that is mounted inside the housing 14 and at least partially within the roller tube 18. The motor drive unit 15 may be configured to allow for control of the rotation of the roller tube 18 by a user of the motorized sheer shading system 10, so that the user may move the sheer shade material 22 to a desired position. The motor drive unit 15 may include sensors that monitor the position of the sheer shade material 22, so that the motor drive unit 15 knows the position of the sheer shade material 22 relative to certain limits associated with the sheer shade material 22 at any given time. The motor drive unit 15 may be locally controlled (e.g., with a push button on the motor drive unit 15) and/or remotely controlled (e.g., wirelessly controlled with an infrared (IR) or radio frequency (RF) remote control device). The motor drive unit 15 may further include an RF transceiver or receiver, and an antenna that may be enclosed within the housing 14 or coupled to an exterior portion of the housing 14. Examples of motor drive units for motorized roller shades are described in greater detail in U.S. Pat. No. 6,983,783, issued Jan. 10, 2006, entitled "Motorized Shade Control System," U.S. Pat. No. 7,723,939, issued May 25, 2010, entitled "Radio-Frequency Controlled Motorized Roller Shade," and U.S. Pat. No. 7,839,109, issued Nov. 23, 2010, entitled "Method Of Controlling A Motorized Window Treatment," the entire contents of each of which are incorporated herein by reference. It should be appreciated that any motor drive unit or drive system may be used to control the roller tube 18.

As shown in FIGS. 2A-2C, the motor drive unit 15 is operatively coupled to the roller tube 18 and is configured to rotate the roller tube 18 so as to move the sheer shade material 22 from the open position to the closed position and from the closed position to the view position. As shown in FIG. 2A, the sheer shade material 22 is substantially wound about the roller tube 18 when in the open position. As shown in FIG. 2B, the sheer shade material 22 substantially covers the opening (or other structure) and impedes visualization therethrough when in the closed position. And as shown in FIG. 2C, the sheer shade material 22 substantially covers the opening (or other structure) and permits visualization therethrough when in the view position.

As the motor drive unit 15 moves the sheer shade material 22 from the open position to the closed position, the vanes 40 are oriented substantially vertically relative to the first and second sheer fabrics 32, 36. Therefore, visualization through the sheer shade material 22 is impeded as the sheer shade material 22 is moved between the open position and the closed position. When the sheer shade material 22 is at the closed position, further rotation of the roller tube 18 by the motor drive unit 15 will cause the first sheer fabric 32 to move downward along the first direction such that that each vane 40 pivots about a respective pivot point. As shown in FIG. 2C, the vanes 40 are oriented substantially horizontally, or otherwise perpendicular to the first and second sheer fabrics 32, 36, when the sheer shade material 22 is in the view position. It should be appreciated that the vanes 40 may be straight or curved as illustrated when they are horizontal relative to the first and second sheer fabrics 32, 36. It should further be appreciated that the vanes 40 may be angularly offset relative to the first and second sheer fabrics 32, 36 when the sheer shade material 22 is in the view position. Therefore, the view position may be any position such that the sheer shade material 22 permits visualization therethrough. It should further still be appreciated that the vanes 40 may be angularly offset slightly from the first and second sheer fabrics 32, 36, and may still be considered to be oriented substantially vertically relative to the first and second sheer fabrics 32, 36, for example when the sheer shade material 22 is in the closed position and/or moving between the open position and the closed position.

The motor drive unit 15 may be configured to rotate the roller tube 18 so as to move the sheer shade material 22 between the open position and the closed position such that the lower 104 end of the first sheer fabric 32 moves at a substantially constant first speed (e.g., a linear speed) as the lower end 104 of the first sheer fabric 32 moves between the open position and the closed position. The motor drive unit 15 may be further configured to reduce the rotational speed of the roller tube 18 during movement of the sheer shade material 22 between the closed position and the view position, such that the lower end 104 of the first sheer fabric 32 moves (e.g., pivots relative to the lower end 106 of the second sheer fabric 36) at a substantially constant second speed that is slower than the first speed as the sheer shade material 22 is moved between the closed position and the view position. The vanes 40 may tilt relative to the first and second sheer fabrics 32, 36 at a slower speed during movement of the sheer shade material 22 from the closed position to the view position, and from the view position to the closed position. Slowing the rotational speed of the roller tube 18 during tilt of the vanes 40, relative to the rotational speed during raising or lowering the sheer shade material 22, allows for more precise control of the tilt position of the vanes 40, while maintaining an adequate lifting speed of the sheer shade material 22 while opening and closing the sheer shade material 22.

As shown in FIGS. 2A and 2B, the winding receipt of the sheer shade material 22 by the roller tube 18 creates overlapping layers of material, thereby varying the distance between the rotational axis of the roller tube 18 and the point at which the sheer shade material 22 is being windingly received by the roller tube 18. As a result, movement speed of the sheer shade material 22 will progressively increase as the sheer shade material 22 is raised or progressively decrease as the sheer shade material 22 is lowered if the roller tube 18 were to be rotated at a constant speed. The motor drive unit 15 may be configured to vary the rotational speed of the roller tube 18 to thereby control the speed of the sheer shade material 22 while it is moving between the open position, the closed position, and the view position.

Figure 3:
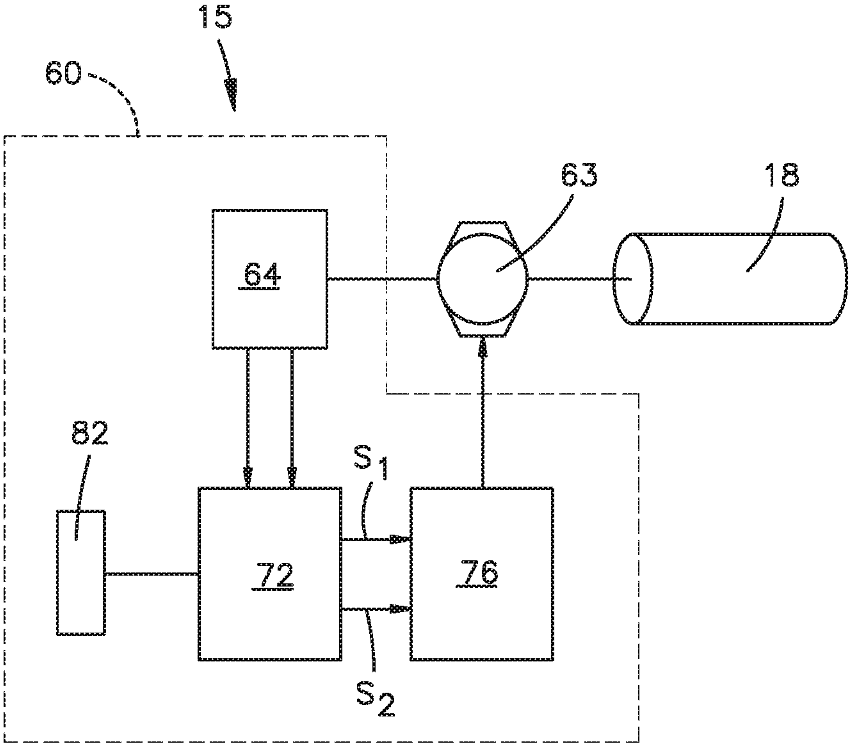
FIG. 3 is a simplified block diagram of an example motor drive unit that may be implemented in the example motorized sheer shading system depicted in FIG. 1A.
Figure 4:
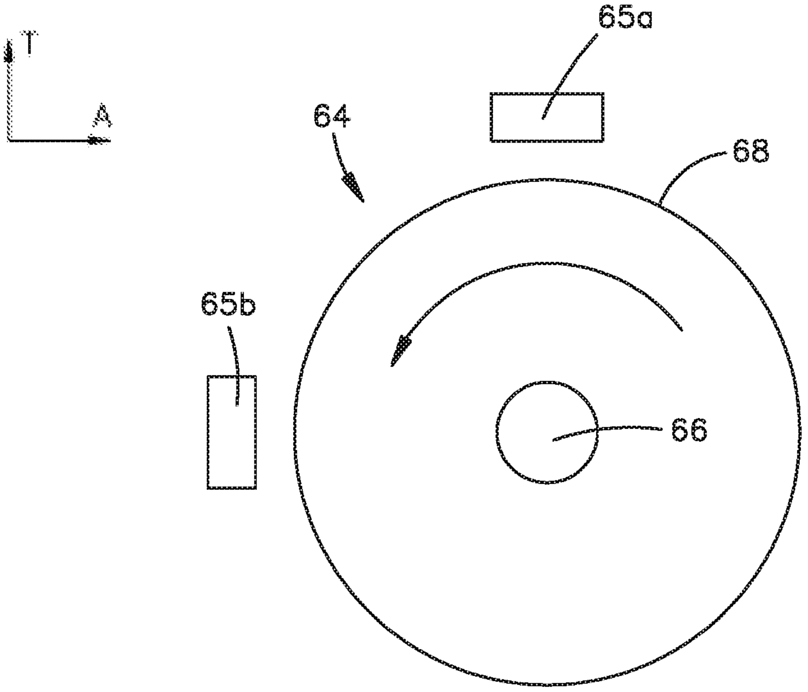
FIG. 4 is a partial schematic of a Hall effect sensor that may be included in the example motor drive unit depicted in FIG. 3.

Now in reference to FIGS. 3 and 4, the motorized sheer shading system 10, and in particular the motor drive unit 15, may further include a control system 60 that controls a motor 63 of the motor drive unit 15 to vary the rotational speed of the roller tube 18 as the sheer shade material 22 is moved between the open, closed, and view positions, so that the desired first and second speeds of the sheer shade material 22 may be maintained during movement between the open, closed, and view positions. As shown in FIG. 3, the control system 60 may include a Hall effect sensor assembly 64 (e.g., including a Hall effect sensor circuit) that is responsive to the motor 63 for providing information regarding rotational speed and/or direction of an output shaft 66 of the motor 63. As shown in FIG. 4, the Hall effect sensor assembly 64 may include a sensor magnet 68 that is secured to the output shaft 66 and first and second Hall effect sensors 65*a*, 65*b* located adjacent the periphery of the sensor magnet 68. The first and second Hall effect sensors 65*a* and 65*b* may provide output signals in the form of pulse trains, the frequency of which may be a function of the rotational speed of the output shaft 66 of the motor 63.

As shown in FIG. 3, the control system 60 may further include a control circuit, such as a microprocessor 72, which may be communicatively connected to the Hall effect sensor assembly 64 to receive the pulse train signals generated by rotation of the output shaft 66. The microprocessor 72 may use information regarding the rotation of the output shaft 66 to track the position of the sheer shade material 22 as it is moved between the open, closed, and view positions. The control system 60 may further include a memory 82 (e.g., an integrated circuit, RAM, ROM, etc.) that is communicatively connected to the microprocessor 72. The microprocessor 72 may be configured to direct motor control signals S1 and S2 to the motor 63, through for example an H-bridge drive circuit 76. Control signal S1 may direct the motor 63 to rotate the roller tube 18 in a first rotational direction or an opposed second rotational direction, and control signal S2 may direct the motor 63 to vary the rotational speed of the roller tube 18.

The microprocessor 72 may be configured to control the motor 63 to vary the rotational speed of the roller tube 18 during movement of the sheer shade material 22 from the open position to the closed position such that the lower end 104 of the first sheer fabric 32 moves at the substantially constant first speed as the sheer shade material 22 is moved from the open position to the closed position. The microprocessor 72 may further be configured to control the motor 63 to vary the rotational speed of the roller tube 18 during movement of the sheer shade material 22 from the closed position to the view position such that the lower end 104 of the first sheer fabric 32 moves at the substantially constant second speed as the sheer shade material 22 is moved from the closed position to the view position. An example of a system for controlling roller tube rotational speed is described in greater detail in U.S. Pat. No. 7,281,565, issued Oct. 16, 2007, entitled "System For Controlling Roller Tube Rotational Speed For Constant Linear Shade Speed," the entire contents of which is incorporated herein by reference.

The motorized sheer shading system 10 may be configured to move the sheer shade material 22 in accordance with a preferred (e.g., desired) operational scheme. For example, the motorized sheer shading system 10 may be configured to rotate the roller tube 18 at a first rotational speed when moving the sheer shade material 22 from the open position to the closed position and/or from the closed position to the open position. The motorized sheer shading system 10 may be configured to rotate the roller tube 18 at a second rotational speed that is slower than the first rotational speed when moving the sheer shade material 22 between closed and view positions. This may allow the sheer shade material 22 to move quickly from the open position to the closed position at the first speed, thereafter moving from the closed position to the view position in accordance with the second speed to allow a user to make fine adjustments to the positioning of the plurality of vanes 40 (e.g., to the angles of the vanes 40), and thus to how much visualization through the sheer shade material 22 is permitted.

During movement of the sheer shade material 22 from the closed position to the view position, the motor 63 may be controlled so as to reduce the rotational speed of the roller tube 18 to a speed that is slower than a slowest rotational speed of the roller tube 18 during movement of the sheer shade material 22 from the open position to the closed position. For example, the motor 63 may be controlled to vary the rotational speed of the roller tube 18 such that the first speed is between about 3.0 inches per second and about 4.0 inches per second and the second speed is slower than the first speed. In an example configuration, the motor 63 may be controlled to vary the rotational speed of the roller tube 18 such that the first speed is about 3.6 inches per second.

The control system 60 may be configured to control the motor 63 (e.g., via the microprocessor 72) to vary the rotational speed of the roller tube 18 as it moves between the open, closed, and view positions. For example, the control system 60 may be configured to control the motor 63 such that the roller tube 18 rotates at a first average rotational speed during movement of the sheer shade material 22 from the open position to the closed position and from the closed position to the open position. The control system 60 may be further configured to control the motor 63 such that the roller tube 18 rotates at a second average rotational speed during movement of the sheer shade material 22 from the closed position to the view position and from the view position to the closed position. Stated differently, the motor 63 may be controlled to reduce the rotational speed of the roller tube 18 as the sheer shade material 22 moves from the closed position to the view position, relative to the rotational speed of the roller tube 18 as the sheer shade material 22 moves from the open position to the closed position. In this regard, the second average rotational speed may be slower than the first average rotational speed. The first average rotational speed may correspond to the first speed, and may be for example, between about 40 revolutions per minute and about 50 revolutions per minute, and the second average rotational speed may correspond to the second speed, and may be for example, between about 20 revolutions per minute and about 30 revolutions per minute. It should be appreciated, however, that the motor 63 may be controlled to vary the rotational speed of the roller tube 18 such that the lower end 104 of the first sheer fabric 32 moves at any first and second speeds.

During an example process for configuring the motorized sheer shading system 10, information related to the operation of the motorized sheer shading system 10 in accordance with the preferred scheme may be stored in the motorized sheer shading system 10, for example stored in the memory 82. The information may include one or more values related to respective components of the motorized sheer shading system 10, upon which one or more parameters for controlling operation of the sheer shade material 22 may be based. For example, the information may include one or more of values that represent an outer diameter of the roller tube 18, a thickness of the sheer shade material 22 when the sheer shade material 22 is in the closed position, a length of the sheer shade material 22 that is wound about the roller tube 18 when the sheer shade material 22 is in the closed position, a first speed for moving the sheer shade material 22 from the open position to the closed position and/or from the closed position to the open position, and a second speed for moving the sheer shade material 22 from the closed position to the view position.

The microprocessor 72 may control how the motor drive unit 15 drives the roller tube 18, based on the information (e.g., the one or more values). For example, the microprocessor 72 may determine respective rotational speeds necessary for the roller tube 18 to windingly receive the sheer shade material 22 at the view position and at the closed position based on the information. These rotational speeds may be associated with initial receipt of the sheer shade material 22 by the roller tube 18, and may be referred to as base rotational speeds.

The microprocessor 72 may calculate a number of revolutions of the roller tube 18 necessary to wind the length of the sheer shade material 22 from the view position to the closed position, and/or the number of revolutions of the roller tube 18 necessary to wind the length of the sheer shade material 22 from the closed position to the open position. As described elsewhere herein, the distance between the rotational axis and the point at which the sheer shade material 22 is windingly received onto the roller tube 18 may increase from the view position because of overlapping layers of material. The microprocessor 72 may calculate an increase in this distance at both the closed and open positions, for example based on the input value for the thickness of the sheer shade material 22 and the calculated number of revolutions.

The microprocessor 72 may operate the motor drive unit 15 to maintain the first speed while the sheer shade material 22 is moved between the open and closed positions, for example as a radius of the roller tube 18 and sheer shade material 22 windingly received thereon increases or decreases. For example, the microprocessor 72 may calculate a reduced rotational speed that will drive the sheer shade material 22 at the desired first speed for respective larger radiuses at the closed and open positions. In this regard, a total amount by which the rotational speed of the roller tube 18 will need to be reduced by the control system 60 during the winding and/or unwinding of the sheer shade material 22 to maintain the constant first speed between the open and closed positions. The microprocessor 72 may calculate respective rotational speeds that will cause the motor drive unit 15 to maintain the constant second speed as the sheer shade material 22 moves between the closed and view positions. The microprocessor 72 may track the position of the sheer shade material 22, and based on the a position of the sheer shade material 22, the microprocessor 72 may adjust the motor 63 to vary the speed of the roller tube 18 so that the desired first and/or second speeds are maintained.

Figure 5:
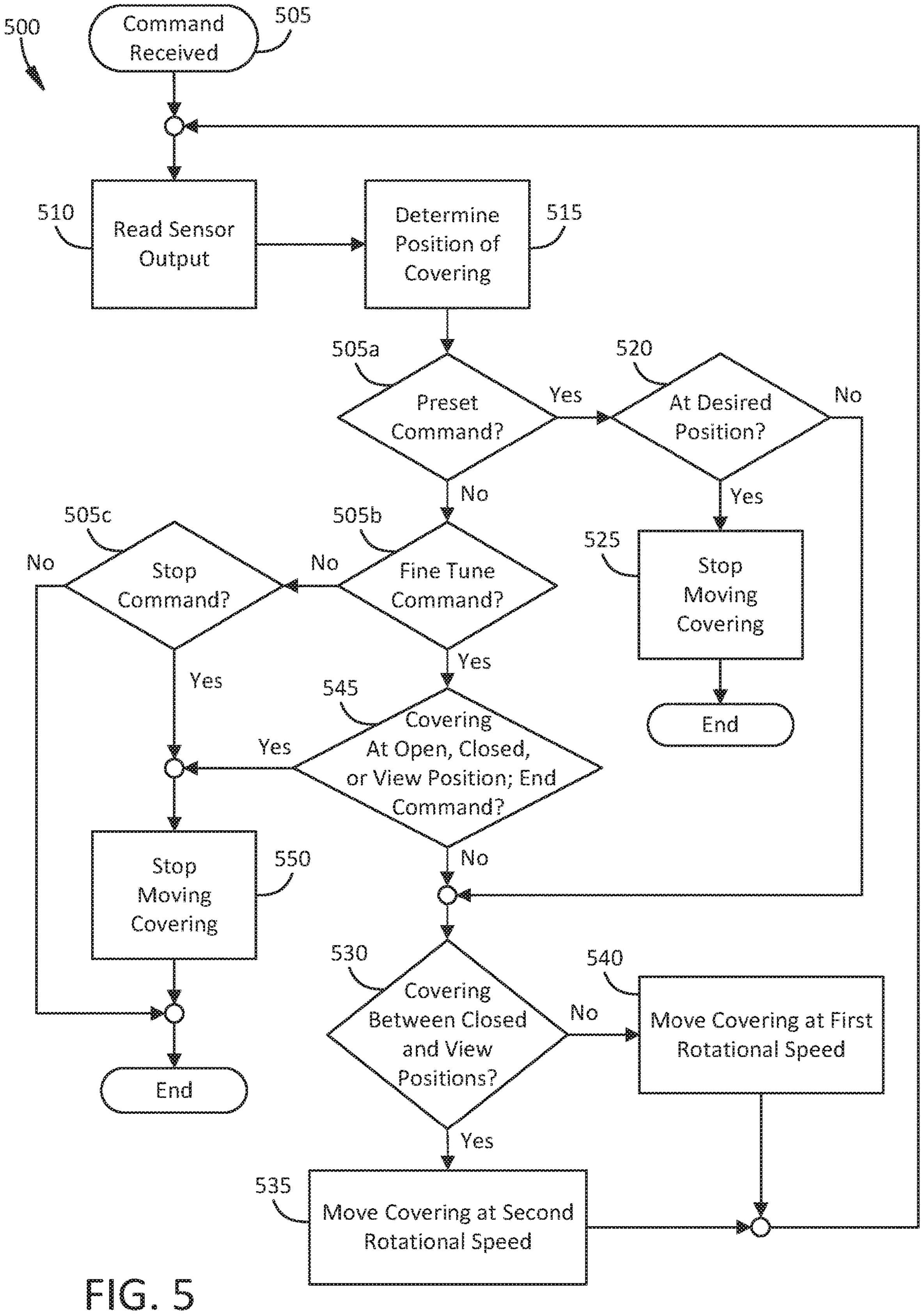
FIG. 5 is a flow diagram illustrating an example process for controlling a motorized sheer shading system.

FIG. 5 is a flow diagram illustrating an example process 500 for controlling a motorized sheer shading system, for example the motorized sheer shading system 10. One or more steps of the example process 500 may be encoded in a software and/or firmware routine that may be stored in the memory 82, and retrieved for execution by the microprocessor 72, for example. It should be appreciated that the example process 500 is not limited to implementation with the motorized sheer shading system 10. For example, the example process 500 may be implemented (e.g., as described or suitably adapted) for controlling other motorized shading systems.

The example process 500 may be performed during operation of the motorized sheer shading system 10. For example, the process 500 may be executed by the microprocessor 72 during movement of the sheer shade material 22 (e.g., between the open and closed positions, between the closed and view positions, and/or between the view and open positions).

At 505, a command to move the sheer shade material 22 may be received by the motorized sheer shading system 10 (e.g., received by the control system 60). For example, the command may be received from a remote control device that is associated with the motorized sheer shading system 10. The command may be, for example, a preset command 505*a*, a fine tune command 505*b*, a stop command 505*c*, any combination of these commands, or another command.

A preset command 505*a* (e.g., a go-to command) may be associated with a particular position of the sheer shade material 22, such as the open position, the closed position, the view position, or an intermediate position (e.g., between the open and closed positions or between the closed and view positions). A preset command 505*a* may be invoked, for example, by a user pressing and releasing a corresponding control, such as an open button, a close button, a view button, or a preset button (e.g., that corresponds to a user-programmed position of the sheer shade material 22) on a remote control device.

A fine tune command 505*b* may be associated with moving the sheer shade material 22 in a specific direction. For example, a fine tune command 505*b* may be associated with moving the sheer shade material 22 from the view position toward the closed and/or open positions, from the closed position toward the open position, from the closed position toward the view position, or from the open position toward the closed and/or view positions. A fine tune command 505*b* may be invoked, for example, by a user pressing and holding a corresponding control, such as a raise button or a lower button on a remote control device.

A stop command 505*c* may be associated with stopping movement of the sheer shade material 22. For example, the receipt of a command that is the same or different from a currently executing command may be interpreted (e.g., by the microprocessor 72) as a stop command 505*c*. To illustrate, if a preset command 505*a* (e.g., an open command) is received, and a subsequent, interrupting command (e.g., another open command, a different preset command 505*a*, or a fine tune command 505*b*) is received before execution of the preset command 505*a* is completed (e.g., before the sheer shade material 22 reaches the open position), the interrupting command may be interpreted as a stop command 505*c*, such that movement of the sheer shade material 22 is ceased upon receipt of the interrupting command. A stop command 505*c* may be generated, for example by the microprocessor 72, when a fine tune command 505*b* ends (e.g., when a user releases a raise button or a lower button). The motorized sheer shading system 10 may include a designated stop control, for example a stop button on a remote control device. Such a stop button may supplement, or replace, the interpretation of an interrupting command as a stop command 505*c* and/or the generation of a stop command 505*c* at the end of a fine tune command 505*b*.

Upon receipt of the command, the microprocessor 72 may, at 510, receive (e.g., read) a sensor input, for example an input from the Hall effect sensor assembly 64. At 515, the microprocessor 72 may determine a current position of the sheer shade material 22, for example based on the sensor input.

If the received command is a preset command 505*a*, the microprocessor 72 may control the motor drive unit 15 to begin rotating, to continue rotating, or to reverse the direction of rotation of, the roller tube 18, such that the sheer shade material 22 moves from the current position toward the position indicated in the preset command 505*a*. The microprocessor 72 may, at 520, determine whether the sheer shade material 22 is at a position indicated in the preset command 505*a* (e.g., a desired position). For example, the microprocessor 72 may compare the current position of the sheer shade material 22 (e.g., as determined at 515) with the position indicated in the preset command 505*a*. If the current position of the sheer shade material 22 matches the position indicated in the preset command 505*a*, the microprocessor 72 may, at 525, control the motor drive unit 15 to stop rotating the roller tube 18, such that the sheer shade material 22 stops moving, and the example process 500 may end.

If the current position of the sheer shade material 22 does not match the position indicated in the preset command 505*a*, the microprocessor 72 may, at 530, determine whether the sheer shade material 22 is currently positioned between the closed and view positions. If, the sheer shade material 22 is currently positioned between the closed and view positions the microprocessor 72 may, at 535, control the motor drive unit 15 to rotate the roller tube 18 at a rotational speed (e.g., the second rotational speed) that is associated with moving the sheer shade material 22 between the closed and view positions, for example such that the lower end 104 of the first sheer fabric 32 moves (e.g., pivots) at the second speed. The microprocessor 72 may continue to read sensor inputs (e.g., returning to 510), to update the current position of the sheer shade material 22 (e.g., returning to 515), to compare the updated current position to the position indicated in the preset command 505*a* (e.g., returning to 520), to determine whether the sheer shade material 22 is positioned between the closed position and the view position (e.g., returning to 530), and to cause the motor drive unit 15 to rotate the roller tube 18 at the first or second rotational speed (e.g., at 540 or 535, respectively) until the sheer shade material 22 arrives at the position indicated in the preset command 505*a*, at which time the microprocessor 72 may, at 525, control the motor drive unit 15 to stop rotating the roller tube 18, such that the sheer shade material 22 stops moving, and the example process 500 may end.

If the sheer shade material 22 is not currently positioned between the closed and view positions, the microprocessor 72 may, at 540, control the motor drive unit 15 to rotate the roller tube 18 at a rotational speed (e.g., the first rotational speed) that is associated with moving the sheer shade material 22 between the open and closed positions, for example such that the lower end 104 of the first sheer fabric 32 moves at the first speed. As the sheer shade material 22 moves, the microprocessor 72 may adjust the rotational speed of the roller tube 18 to maintain a substantially constant linear speed of the sheer shade material 22, for example by maintaining rotation of the roller tube 18 at the first average rotational speed. The microprocessor 72 may continue to read sensor inputs (e.g., returning to 510), to update the current position of the sheer shade material 22 (e.g., returning to 515), to compare the updated current position to the position indicated in the preset command 505*a* (e.g., returning to 520), to determine whether the sheer shade material 22 is positioned between the closed position and the view position (e.g., returning to 530), and to cause the motor drive unit 15 to rotate the roller tube 18 at the first or second rotational speeds (e.g., at 540 or 535, respectively) until the sheer shade material 22 arrives at the position indicated in the preset command 505*a*, at which time the microprocessor 72 may, at 525, control the motor drive unit 15 to stop rotating the roller tube 18, such that the sheer shade material 22 stops moving, and the example process 500 may end.

If the received command is a fine tune command 505*b* (e.g., a raise command or a lower command), the microprocessor 72 may control the motor drive unit 15 to begin rotating, to continue rotating, or to reverse the direction of rotation of, the roller tube 18, such that the sheer shade material 22 moves in the direction indicated in the fine tune command 505*b*. The microprocessor 72 may, at 545, determine whether the sheer shade material 22 is in the open position, the closed position, or the view position. For example, the microprocessor 72 may compare the current position of the sheer shade material 22 (e.g., as determined at 515) with open, closed, and view positions. If the current position of the sheer shade material 22 matches one of the open, closed, or view positions, the microprocessor 72 may, at 550, control the motor drive unit 15 to stop rotating the roller tube 18, such that the sheer shade material 22 stops moving, and the example process 500 may end.

If the current position of the sheer shade material 22 does not match one of the open, closed, or view positions, the microprocessor 72 may, at 530, determine whether the sheer shade material 22 is currently positioned between the closed and view positions. If, the sheer shade material 22 is currently positioned between the closed and view positions the microprocessor 72 may, at 535, control the motor drive unit 15 to rotate the roller tube 18 at a rotational speed (e.g., the second rotational speed) that is associated with moving the sheer shade material 22 between the closed and view positions, for example such that the lower end 104 of the sheer shade material 22 moves (e.g., pivots) at the second speed. The microprocessor 72 may continue to read sensor inputs (e.g., returning to 510), to update the current position of the sheer shade material 22 (e.g., returning to 515), to determine whether the updated current position corresponds to one of the open, closed, or view positions (e.g., returning to 545), to determine whether the sheer shade material 22 is positioned between the closed position and the view position (e.g., returning to 530), and to cause the motor drive unit 15 to rotate the roller tube 18 at the first or second rotational speed (e.g., at 540 or 535, respectively) until the fine tune command 505*b* ends (e.g., if a control is released such that the command is no longer received) or until the sheer shade material 22 arrives at one of the open, closed, or view positions (e.g., at 545), at which time the microprocessor 72 may, at 550, control the motor drive unit 15 to stop rotating the roller tube 18, such that the sheer shade material 22 stops moving, and the example process 500 may end.

If the sheer shade material 22 is not currently positioned between the closed and view positions, the microprocessor 72 may, at 540, control the motor drive unit 15 to rotate the roller tube 18 at a rotational speed (e.g., the first rotational speed) that is associated with moving the sheer shade material 22 between the open and closed positions, for example such that the lower end 104 of the first sheer fabric 32 moves at the first speed. As the sheer shade material 22 moves, the microprocessor 72 may adjust the rotational speed of the roller tube 18 to maintain a substantially constant linear speed of the sheer shade material 22, for example by maintaining rotation of the roller tube 18 at the first average rotational speed. The microprocessor 72 may continue to read sensor inputs (e.g., returning to 510), to update the current position of the sheer shade material 22 (e.g., returning to 515), to determine whether the updated current position corresponds to one of the open, closed, or view positions (e.g., returning to 545), to determine whether the sheer shade material 22 is positioned between the closed position and the view position (e.g., returning to 530), and to cause the motor drive unit 15 to rotate the roller tube 18 at the first or second rotational speed (e.g., at 540 or 535, respectively) until the fine tune command 505*b* ends (e.g., if a control is released such that the command is no longer received) or until the sheer shade material 22 arrives at one of the open, closed, or view positions (e.g., at 545), at which time the microprocessor 72 may, at 550, control the motor drive unit 15 to stop rotating the roller tube 18, such that the sheer shade material 22 stops moving, and the example process 500 may end.

If the received command is a stop command 505*c*, the microprocessor 72 may, at 550, control the motor drive unit 15 to stop rotating the roller tube 18, such that the sheer shade material 22 stops moving and execution of the example process 500 may end. If the received command is not recognized by the control system 60, the microprocessor may ignore the command, and the example process 500 may end.

Figure 6:
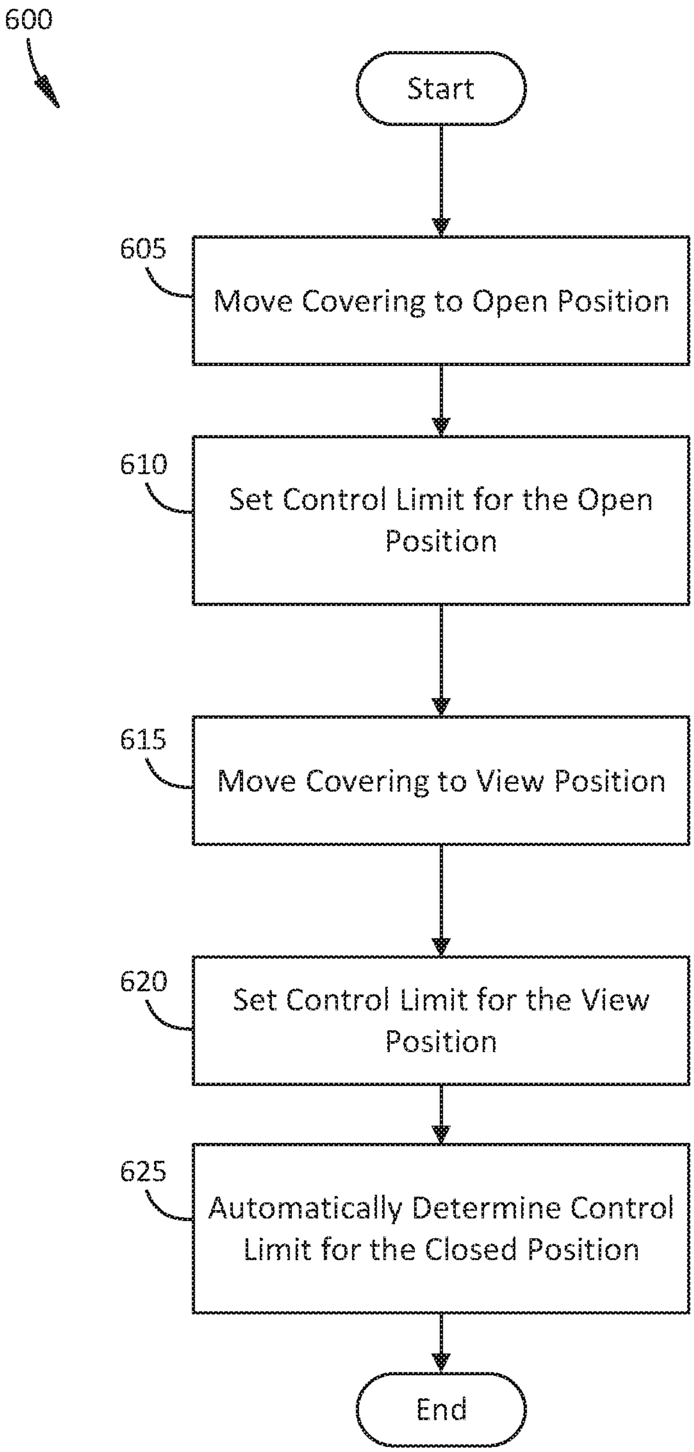
FIG. 6 is a flow diagram illustrating an example process for setting control limits of a motorized sheer shading system.

FIG. 6 is a flow diagram illustrating an example process 600 for setting control limits of a motorized sheer shading system, for example the motorized sheer shading system 10. The process 600 may be performed, for example, when the motorized sheer shading system 10 is mounted to structure (e.g., proximate to an opening such as a window). One or more steps of the example process 600 may be encoded in a software and/or firmware routine that may be stored in the memory 82, and retrieved for execution by the microprocessor 72, for example. It should be appreciated that the example process 600 is not limited to implementation with the motorized sheer shading system 10. For example, the example process 600 may be implemented (e.g., as described or suitably adapted) for setting limits of other motorized shading systems.

At 605, the sheer shade material 22 may be moved to the open position. The sheer shade material 22 may be moved, for example, by a user operating the motor 63 to rotate the roller tube 18 (e.g., by the user pressing a button on the motor drive unit 15 or a button on a remote control device). In this regard, the user may manually determine the open position. At 610, once the sheer shade material 22 is in the open position, a control limit for the open position of the sheer shade material 22 may be set or otherwise programmed. In accordance with the example process 600, the control limit for the open position may be referred to as a first control limit of the motorized sheer shading system 10. The control limit for the open position may be stored in terms of rotation of the roller tube 18. For example, the control limit for the open position may be stored in response to pressing a button on the motor drive unit 15 or a button on a remote control device that controls the operation of the motor drive unit 15, for instance when the sheer shade material 22 is positioned at the open position. Pressing the button may cause the microprocessor 72 to store the control limit for the open position, for example in the memory 82.

At 615, the motor 63 may be operated (e.g., by a user) to move the sheer shade material 22 from the open position to the view position (e.g., by the user pressing a button on the motor drive unit 15 or a button on a remote control device). In this regard, the user may manually determine the view position. At 620, once the sheer shade material 22 is in the view position, a control limit for the view position of the sheer shade material 22 may be set or otherwise programmed, for example in response to pressing a button on the motor drive unit 15 or a button on the remote control device that controls the operation of the motor drive unit 15. In accordance with the example process 600, the control limit for the view position may be referred to as a second control limit of the motorized sheer shading system 10.

At 625, the microprocessor 72 may determine (e.g., automatically, without user intervention) a control limit for the closed position of the sheer shade material 22. In accordance with the example process 600, the control limit for the closed position may be referred to as a third control limit of the motorized sheer shading system 10. The microprocessor 72 may determine the control limit for the closed position, based at least partially on the control limit for the view position. For example, the control limit for the closed position may be a predetermined offset away from the control limit for the view position. The offset may correspond to a portion of an angular rotation of the roller tube 18. For example, in accordance with the illustrated roller tube 18, the offset may be approximately one quarter of a rotation of the roller tube 18. It should be appreciated that the offset may depend upon the diameter of the roller tube 18. The offset may be stored in the memory 82. The control limit for the closed position may be automatically determined (e.g., by the microprocessor 72) based at least partially on a distance D measured from the first sheer fabric 32 to the second sheer fabric 36 along the lateral direction A. The distance D may be referred to as a first distance, and may represent a diameter of the roller tube 18. The control system 60 of the motorized sheer shading system 10 may be configured to allow adjustment of the automatically determined control limit for the closed position. For example, the microprocessor 72 may be configured to enable adjustment of the control limit for the closed position (e.g., manual adjustment by a user via the operation of one or more fine tune controls). The microprocessor 72 may store the adjusted control limit for the closed position in the memory 82 as a preset for the closed position.

It should be appreciated that the control limit for the closed position of the sheer shade material 22 may be automatically determined based on one or more other factors. For example, the control limit for the closed position of the sheer shade material 22 may be automatically determined based at least partially on the second speed. It should further be appreciated that the control limit for the closed position may be set, along with the control limit for the open position and the control limit for the view position, for example by a user of the motorized sheer shading system 10.

Figure 7:
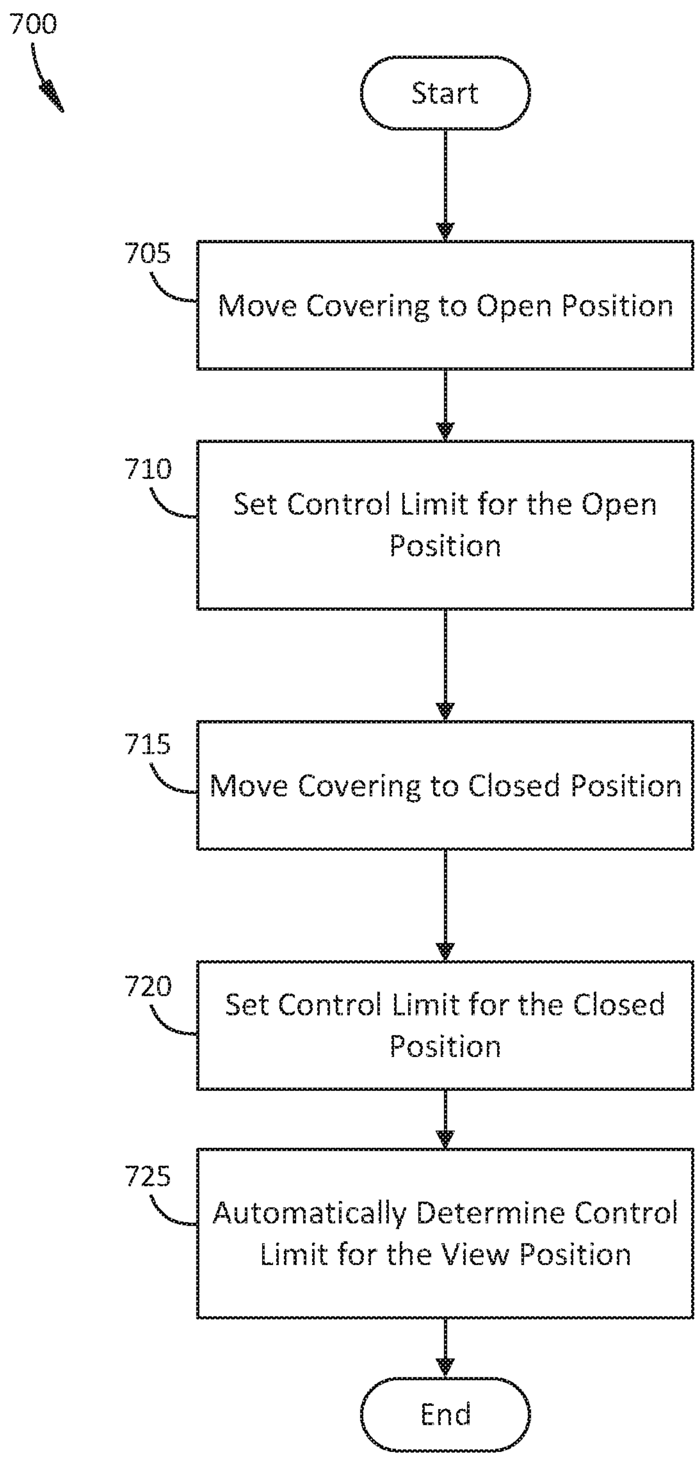
FIG. 7 is a flow diagram illustrating another example process for setting control limits of a motorized sheer shading system.

FIG. 7 is a flow diagram illustrating another example process 700 for setting control limits of a motorized sheer shading system, for example the motorized sheer shading system 10. The process 700 may be performed, for example, when the motorized sheer shading system 10 is mounted to structure (e.g., proximate to an opening such as a window). One or more steps of the example process 700 may be encoded in a software and/or firmware routine that may be stored in the memory 82, and retrieved for execution by the microprocessor 72, for example. It should be appreciated that the example process 700 is not limited to implementation with the motorized sheer shading system 10. For example, the example process 700 may be implemented (e.g., as described or suitably adapted) for setting limits of other motorized shading systems.

At 705, the sheer shade material 22 may be moved to the open position. The sheer shade material 22 may be moved, for example, by a user operating the motor 63 to rotate the roller tube 18 (e.g., by the user pressing a button on the motor drive unit 15 or a button on a remote control device). In this regard, the user may manually determine the open position. At 710, once the sheer shade material 22 is in the open position, a control limit for the open position of the sheer shade material 22 may be set or otherwise programmed. In accordance with the example process 700, the control limit for the open position may be referred to as a first control limit of the motorized sheer shading system 10. The control limit for the open position may be stored in terms of rotation of the roller tube 18. For example, the control limit for the open position may be stored in response to pressing a button on the motor drive unit 15 or a button on a remote control device that controls the operation of the motor drive unit 15, for instance when the sheer shade material 22 is positioned at the open position. Pressing the button may cause the microprocessor 72 to store the control limit for the open position, for example in the memory 82.

At 715, the motor 63 may be operated (e.g., by a user) to move the sheer shade material 22 from the open position to the closed position (e.g., by the user pressing a button on the motor drive unit 15 or a button on a remote control device). In this regard, the user may manually determine the closed position. At 720, once the sheer shade material 22 is in the view position, a control limit for the view position of the sheer shade material 22 may be set or otherwise programmed, for example in response to pressing a button on the motor drive unit 15 or a button on the remote control device that controls the operation of the motor drive unit 15. In accordance with the example process 700, the control limit for the view position may be referred to as a second control limit of the motorized sheer shading system 10.

At 725, the microprocessor 72 may determine (e.g., automatically, without user intervention) a control limit for the view position of the sheer shade material 22. In accordance with the example process 700, the control limit for the view position may be referred to as a third control limit of the motorized sheer shading system 10. The microprocessor 72 may determine the control limit for the view position, based at least partially on the control limit for the closed position. For example, the control limit for the view position may be a predetermined offset away from the control limit for the closed position. The offset may correspond to a portion of an angular rotation of the roller tube 18. For example, in accordance with the illustrated roller tube 18, the offset may be approximately one quarter of a rotation of the roller tube 18. It should be appreciated that the offset may depend upon the diameter of the roller tube 18. The offset may be stored in the memory 82. The control limit for the view position may be automatically determined (e.g., by the microprocessor 72) based at least partially on a distance D measured from the first sheer fabric 32 to the second sheer fabric 36 along the lateral direction A. The distance D may be referred to as a first distance, and may represent a diameter of the roller tube 18. The control system 60 of the motorized sheer shading system 10 may be configured to allow adjustment of the automatically determined control limit for the view position. For example, the microprocessor 72 may be configured to enable adjustment of the control limit for the view position (e.g., manual adjustment by a user via the operation of one or more fine tune controls). The microprocessor 72 may store the adjusted control limit for the view position in the memory 82 as a preset for the closed position.

It should be appreciated that the control limit for the view position of the sheer shade material 22 may be automatically determined based on one or more other factors. For example, the control limit for the view position of the sheer shade material 22 may be automatically determined based at least partially on the first speed. It should further be appreciated that the control limit for the view position may be set, along with the control limit for the open position and the control limit for the closed position, for example by a user of the motorized sheer shading system 10.

The control system 60 may be configured such that one or more additional control limits for the sheer shade material 22 may be set (e.g., by a user) and/or may be automatically determined by the microprocessor 72. For example, a control limit for the sheer shade material 22 may be set or automatically determined when the sheer shade material 22 is positioned in a partial view position wherein the vanes 40 are angularly offset relative to the first and second sheer fabrics 32, 36 (e.g., angled relative the orientation of the vanes 40 when the sheer shade material 22 is in the view position). The control limit for the partial view position may be automatically determined (e.g., by the microprocessor 72) based at least partially on the distance D and/or on the second speed. The control limit for the partial view position may be referred to as a fourth control limit. The partial view control limit may be associated with a preset command, such that receiving the preset command causes the control system 60 to move the sheer shade material 22 to the partial view position.

When two or more motorized sheer shading systems 10 are installed next to each other, for example in a single opening or in similarly sized openings, the movements of the respective sheer shade materials 22 may be synchronized. This may be enabled, for instance by the respective microprocessors 72 automatically determining, or otherwise calculating, the respective closed positions of the sheer shade materials 22 based on the respective view positions of the sheer shade materials 22. That is, the respective vanes 40 and hembars 24 of the two or more motorized sheer shading systems 10 will pivot and move at the same rate and time, and thus be synchronized.

When the control limits are set, the open, closed, view, and/or partial view positions of the sheer shade material 22 may be stored in the memory 82. One or more of the open, closed, view, and/or partial view positions may be configured as presets on a remote control device, such that a user may quickly cause the sheer shade material 22 to move to those positions, for example responsive to the press of a button. For example, the motorized sheer shading system 10 may include a remote control device that is configured to communicate with the control system 60 (e.g., with the microprocessor 72).

Figure 8:
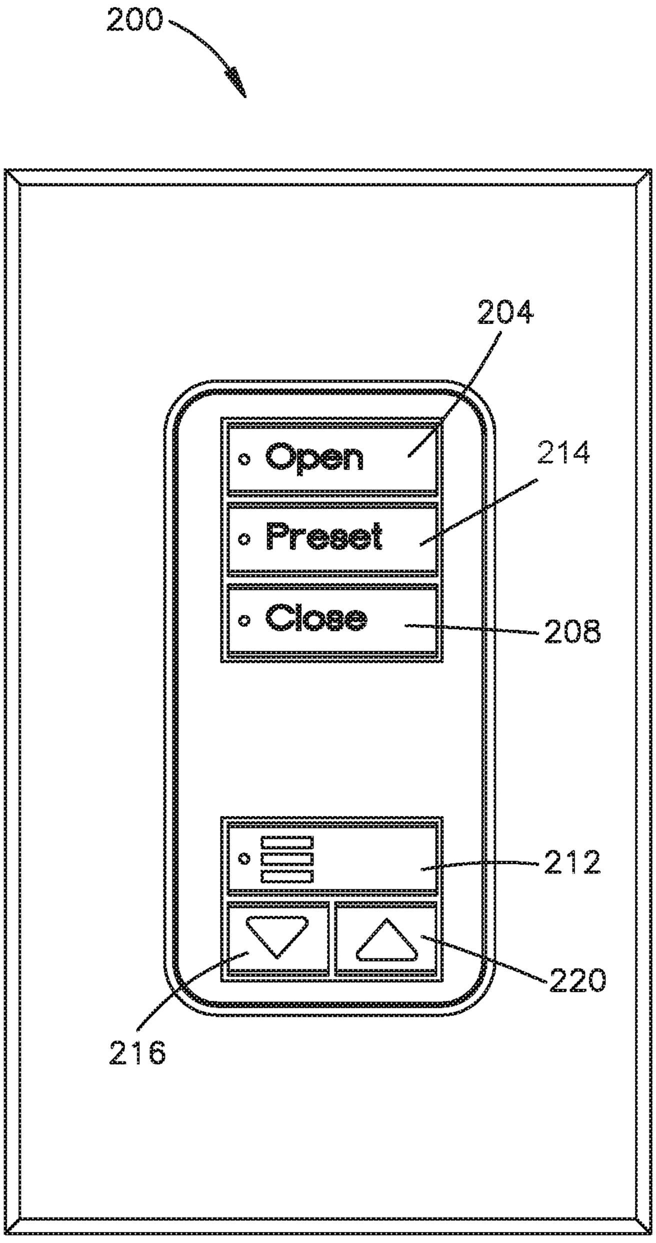
FIG. 8 is a front view of an example remote control device for controlling a motorized sheer shading system.

FIG. 8 depicts an example remote control device 200 that may be used to control the motorized sheer shading system 10. As shown, the remote control device 200 includes a first preset button 204 that is associated with the open position of the sheer shade material 22, a second preset button 208 that is associated with the closed position of the sheer shade material 22, and a third preset button 212 that is associated with the view position of the sheer shade material 22. The remote control device 200 may optionally include a fourth preset button 214 that may user-programmable to be associated with an intermediate position of the sheer shade material 22 (e.g., between the open and closed positions or between the closed and view positions). Pressing the first, second, third, or fourth preset button 204, 208, 210, or 214 may cause the remote control device 200 to transmit a corresponding command (e.g., a corresponding preset command 505*a*).

The remote control device 200 may further include a lower button 216 that may be configured to cause the motor 63 to lower the sheer shade material 22 and a raise button 220 that may be configured to cause the motor 63 to raise the sheer shade material 22. Pressing the lower or raise button 216, 220 may cause the remote control device 200 to transmit a corresponding command (e.g., a corresponding fine tune command 505*b*).

The remote control device 200 may configured such that, if one of the first preset button 204, the second preset button 208, the third preset button 210, the fourth preset button 214, the lower button 216, or the raise button 220 is pressed before an operation that is associated with a currently executing command (e.g., a preset command 505*a*) is completed, the remote control device 200 may transmit a command (e.g., a stop command 505*c*), such that the operation associated with the currently executing command is interrupted and/or stopped (e.g., such that movement of the sheer shade material 22 is halted).

One or both of the lower button 216 and the raise button 220 may be configured such that when the buttons are continuously depressed, the sheer shade material 22 continues to lower or raise, respectively, as the button is held depressed. The control system 60 may be configured such that the sheer shade material 22 stops at one or more control limits (e.g., control limits associated with the open, closed, or view positions) previously set or otherwise determined, even if the respective button is still being depressed.

For example, the motorized sheer shading system 10 may be configured such that when the sheer shade material 22 is in the open position or some position between the closed position and the open position and the lower button 216 is continuously depressed, the sheer shade material 22 will move to the closed position and stop, even if the lower button 216 is still depressed when the sheer shade material 22 reaches the closed position. In accordance with such a configuration, the sheer shade material 22 may move from the closed position toward the view position if the lower button 216 is released when the sheer shade material 22 reaches the closed position, and then the lower button 216 is pressed and held again. The motorized sheer shading system 10 may be configured such that when the sheer shade material 22 is in the closed position and the lower button 216 is continuously depressed, the sheer shade material 22 will move to the view position and stop.

The motorized sheer shading system 10 may be configured such that when the sheer shade material 22 is in the view position or some position between the closed position and the view position and the raise button 220 is continuously depressed, the sheer shade material 22 will move to the closed position and stop, even if the raise button 220 is still depressed when the sheer shade material 22 reaches the closed position. In accordance with such a configuration, the sheer shade material 22 may move from the closed position toward the open position if the raise button 220 is released when the sheer shade material 22 reaches the closed position, and then the raise button 220 is pressed and held again.

It should be appreciated that the remote control device 200 is not limited to the illustrated configuration, such as the number of buttons or functions associated therewith, and that the remote control device 200 may alternatively have any configuration and may have any number of buttons configured to perform any function. For example, the remote control device 200 may alternatively include one or more additional buttons, such as a button associated with a partial view control limit (e.g., as described herein). It should further be appreciated that the motorized sheer shading system 10 may be void of a remote control device 200.

The invention claimed is:

1. A motorized sheer shading system controller, comprising:

memory circuitry; and shade positioning control circuitry operatively coupled to the memory circuitry, the shade positioning control circuitry to:

adjust a rotational speed of a roller tube drive motor to vary a rotational speed of a roller tube to raise or lower a shade hem bar at a constant first speed responsive to receipt of a first instruction to raise or lower the shade; and set the rotational speed of the roller tube drive motor to cause vanes disposed within the shade to travel between a VIEW position and a CLOSED position at a constant second speed responsive to receipt of a second instruction to transition the shade between the VIEW position and the CLOSED position;

wherein the rotational speed of the motor at the second speed is slower than the first speed.

2. The motorized sheer shading system controller of claim 1, the shade positioning control circuitry to further:

receive an input signal indicative of the rotational speed of the roller tube.

3. The motorized sheer shading system controller of claim 2, wherein to receive the input signal indicative of the rotational speed of the roller tube, the shade positioning control circuitry to further:

receive an input signal indicative of the rotational speed of the roller tube via one or more Hall effect sensors.

4. The motorized sheer shading system controller of claim 1, the shade positioning control circuitry to further:

cause the roller tube drive motor to raise or lower the hem bar between an OPEN position and the CLOSED position responsive to receipt of the first instruction to raise or lower the shade.

5. The motorized sheer shading system controller of claim 1 wherein to lower the hem bar to the CLOSED position responsive to receipt of the first instruction to lower the shade, the shade positioning control circuitry to further:

cause the roller tube drive motor to lower the hem bar to the CLOSED position responsive to receipt of a user actuation of a wireless remote-control input device.

6. The motorized sheet shading system controller of claim 1 wherein to lower the hem bar to the CLOSED position responsive to receipt of the user actuation of a first input on a wireless remote-control, the shade positioning control circuitry to further:

maintain the hem bar at the CLOSED position responsive to receipt of an instruction to transition the shade to the CLOSED position after the shade reaches the CLOSED position.

7. A motorized sheer shading system control method, comprising:

adjusting, by a shade positioning control circuitry, a rotational speed of a roller tube drive motor to vary a rotational speed of a roller tube to raise or lower a shade hem bar at a constant first speed responsive to receipt of a first instruction to raise or lower the shade; and setting, by the shade positioning control circuitry, the rotational speed of the roller tube drive motor to cause vanes disposed within the shade to travel between a VIEW position and a CLOSED position at a constant second speed responsive to receipt of a second instruction to transition the shade between the VIEW position and the CLOSED position;

wherein the rotational speed of the motor at the second speed is slower than the first speed.

8. The motorized sheer shading system control method of claim 7, further comprising:

receiving, by the shade positioning control circuitry, an input signal indicative of the rotational speed of the roller tube.

9. The motorized sheer shading system control method of claim 8, wherein receiving the input signal indicative of the rotational speed of the roller tube, further comprises:

receiving, by the shade positioning control circuitry, the input signal indicative of the rotational speed of the roller tube via one or more Hall effect sensors.

10. The motorized sheer shading system control method of claim 7, further comprising:

causing, by the shade positioning control circuitry, the roller tube drive motor to transition the hem bar between an OPEN position and the CLOSED position responsive to receipt of the first instruction to raise or lower the shade.

11. The motorized sheer shading system control method of claim 7, wherein causing the roller tube drive motor to transition the hem bar between the OPEN position and the CLOSED position responsive to receipt of the first instruction to raise or lower the shade further comprises:

causing, by the shade positioning control circuitry, a transition of the hem bar to the CLOSED position responsive to receipt of a user actuation of a wireless remote-control input device.

12. The motorized sheer shading system control method of claim 7 wherein causing the transition of the hem bar to the CLOSED position responsive to receipt of the user actuation of the wireless remote-control input device further comprises causing, by the shade positioning control circuitry, the hem bar to remain fixed at the CLOSED position responsive to receipt of an instruction to transition the shade to the CLOSED position after the shade reaches the CLOSED position.

13. A non-transitory, machine-readable, storage device that includes instructions that, when executed by shade positioning control circuitry, cause the shade positioning control circuitry to:

adjust a rotational speed of a roller tube drive motor to vary a rotational speed of a roller tube to raise or lower a shade hem bar at a constant first speed responsive to receipt of a first instruction to raise or lower the shade; and set the rotational speed of the roller tube drive motor to cause vanes disposed within the shade to travel between a VIEW position and a CLOSED position at a constant second speed responsive to receipt of a second instruction to transition the shade between the VIEW position and the CLOSED position;

wherein the rotational speed of the motor at the second speed is slower than the first speed.

14. The non-transitory, machine-readable, storage device of claim 13 wherein the instructions, when executed by the shade positioning control circuitry, further cause the shade positioning control circuitry to:

receive an input signal indicative of the rotational speed of the roller tube.

15. The non-transitory, machine-readable, storage device of claim 14 wherein the instructions that cause the shade positioning control circuitry to receive the input signal indicative of the rotational speed of the roller tube, further cause the shade positioning control circuitry to:

receive the input signal indicative of the rotational speed of the roller tube via one or more Hall effect sensors.

16. The non-transitory, machine-readable, storage device of claim 13 wherein the instructions, when executed by the shade positioning control circuitry, further cause the shade positioning control circuitry to:

cause the roller tube drive motor to transition the hem bar between an OPEN position and the CLOSED position responsive to receipt of the first instruction to raise or lower the shade.

17. The non-transitory, machine-readable, storage device of claim 13 wherein the instructions that cause the shade positioning control circuitry to cause the roller tube drive motor to transition the hem bar between the OPEN position and the CLOSED position responsive to receipt of the first instruction to raise or lower the shade further cause the shade positioning control circuitry to:

cause a transition of the hem bar to the CLOSED position responsive to receipt of a user actuation of a wireless remote-control input device.

18. The non-transitory, machine-readable, storage device of claim 13 wherein the instructions that cause the shade positioning control circuitry to cause the transition of the hem bar to the CLOSED position responsive to receipt of the user actuation of the wireless remote-control input device further cause the shade positioning control circuitry to:

cause the hem bar to remain fixed at the CLOSED position responsive to receipt of an instruction to transition the shade to the CLOSED position after the shade reaches the CLOSED position.

* * * * *